United States Patent [19]
Foster

[11] Patent Number: 5,851,647
[45] Date of Patent: Dec. 22, 1998

[54] NONWOVEN METAL AND GLASS

[75] Inventor: Richard P. Foster, Norwood, Mass.

[73] Assignee: Hollingsworth & Vose Company, East Walpole, Mass.

[21] Appl. No.: 801,798

[22] Filed: Feb. 14, 1997

[51] Int. Cl.⁶ .................... B32B 3/26; B32B 5/22
[52] U.S. Cl. ............ 428/304.4; 428/379; 428/198; 428/312.2; 428/312.8; 428/317.9; 428/319.1; 442/377; 442/410; 442/411
[58] Field of Search .................. 428/304.4, 379, 428/375, 606, 312.2, 312.8, 317.9, 318.4, 319.1, 292.1, 293.4, 294.4, 198; 442/377, 409, 410, 411, 415

[56] References Cited

U.S. PATENT DOCUMENTS

| | | | |
|---|---|---|---|
| 2,821,261 | 1/1958 | Vixler et al. | |
| 3,364,661 | 1/1968 | Manherz et al. | |
| 3,864,203 | 2/1975 | Marzocchi | 161/175 |
| 3,949,141 | 4/1976 | Marzocchi et al. | 428/378 |
| 4,197,223 | 4/1980 | Bartram | 260/17.2 |
| 4,376,675 | 3/1983 | Perrotta | 162/145 |
| 4,478,618 | 10/1984 | Bly et al. | 55/314 |
| 4,687,579 | 8/1987 | Bergman | 210/347 |
| 4,764,779 | 8/1988 | Sato et al. | 343/897 |
| 4,933,129 | 6/1990 | Huykman | 264/116 |
| 4,994,317 | 2/1991 | Dugan et al. | 428/246 |
| 5,021,283 | 6/1991 | Takenaka et al. | 428/116 |
| 5,044,157 | 9/1991 | Henkel | 60/274 |
| 5,066,538 | 11/1991 | Huykman | 428/288 |
| 5,143,275 | 9/1992 | Hara et al. | 228/119 |
| 5,250,094 | 10/1993 | Chung et al. | 55/523 |
| 5,287,690 | 2/1994 | Toon | 57/210 |
| 5,336,556 | 8/1994 | Yoshida et al. | 428/288 |
| 5,380,580 | 1/1995 | Rogers et al. | 428/219 |
| 5,422,055 | 6/1995 | Yalvac et al. | 264/86 |
| 5,454,845 | 10/1995 | Anahara et al. | 55/267 |
| 5,480,706 | 1/1996 | Li et al. | 428/113 |
| 5,507,899 | 4/1996 | Watanabe et al. | 156/154 |

*Primary Examiner*—Marion F. McCamish
*Assistant Examiner*—Cheryl Juska
*Attorney, Agent, or Firm*—Nutter, McClennen & Fish, LLP

[57] ABSTRACT

A glass and metal fiber material includes a web of nonwoven metal fibers and glass. The metal fibers of the web are joined by bubbles of glass to other metal fibers of the web. The nonwoven metal fibers can be the same or different lengths and do not need to be sintered. The material is flexible and capable of withstanding very high temperatures. Spaces or voids between metal fibers allow embodiments of the material to be porous. However, the voids can be completely or partially filled to alter the porosity of the material. An exemplary method of making the glass and metal fiber material in accordance with the invention includes the steps of juxtaposing metal fibers with glass fibers and heating at least the glass fibers to cause them to melt. The melting glass envelops part or all of the metal fibers. When the glass cools, at least some of the of metal fibers are bound to other metal fibers by the glass. Both the metal and glass fibers can be dispersed in a liquid prior to being mixed together; and a bonding aid can be added to mixture prior to the heating step to temporarily provide stability to the web to permit processing.

18 Claims, 3 Drawing Sheets

NONWOVEN METAL AND GLASS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to nonwoven materials, and more particularly to a flexible, nonwoven material that is capable of withstanding high temperatures and a method of making the material.

BACKGROUND OF THE INVENTION

Nonwoven fabrics are broadly defined as sheet or web structures made by bonding or entangling fibers or filaments by mechanical, thermal or chemical means. Because the fibers do not need to be converted to yarn which is knitted or woven, nonwoven fabrics can be manufactured more rapidly and economically, per foot of fabric, than traditional woven fabrics.

Two well-known manufacturing techniques for nonwoven webs include the wet laid and the dry laid processes. In a wet laid process, fibers are suspended uniformly in water at very high dilutions of 0.01 to 0.5% by weight of fiber. The fiber and water solution is directed to a filter or screen which can be in the form of a wire belt in an inclined position or a cylinder. As the water drains through the filter, the fibers are laid down in a random orientation with respect to each other to provide a loose web. The web is then squeezed between rollers to remove additional water, and dried by passing it through an oven or over drying cans. The wet laid process permits adding chemicals, binders, and colorants before or after the web is formed. It also permits uniform blending of different fibers and provides a fabric with isotropic properties.

The dry laid process includes steps of air laying and carding. Air laying begins by suspending the fibers in air, then collecting them as a sheet on a screen. Fiber deposition onto the screen can be done in a free-fall manner or with the aid of compressed air and/or suction. In a carding step, rotating drums covered with fine wires and teeth comb the fibers into parallel arrays to impart anisotropic properties to the web.

Wet laid and dry laid techniques are well known for manufacturing an enormous range of paper and fabric products with wood pulp fibers and textile fibers. Although relatively rapid and inexpensive to manufacture, these heat destructible materials and products are only suitable for environments and applications that do not exceed a few hundred degrees Fahrenheit.

High temperature applications (above 1,000 degrees Fahrenheit), such as exhaust and process gas filters, as well as air bag filters, are the province of metal and ceramic products. These products are commonly formed as a single monolithic component or as a mechanical assemblage of various high temperature capable components. Woven metal fabrics are also known, but as with woven fabrics, the weaving of wires is a relatively slow and tedious process and the porosity of the weave is difficult to control. Another technique that can use metal fibers or threads is known as sintering, wherein a mass of metal particles or fibers can be shaped and partially fused together by pressure and heating below the melting point of the metal. However, sintering is a time consuming process that requires ovens capable of providing and containing special process gasses, and the resulting product configuration cannot be readily altered. Thus, each of the known techniques and materials has a manufacturing, cost, or performance deficiency.

Just as bolts of fabric provide flexibility of end product configuration, it would be desirable to provide a flexible, fabric-like material capable of withstanding high temperatures that is configurable by an end user. It would be even more beneficial if such a material were capable of being manufactured with existing machinery for wet and dry laid nonwoven fabrics.

SUMMARY OF THE INVENTION

The present invention provides a unique, nonwoven material capable of withstanding temperatures above 1,000 degrees Fahrenheit. The material is surprisingly flexible and extremely uniform in structure.

In an exemplary embodiment of the invention, a glass and metal fiber material includes a web of nonwoven metal fibers and glass, wherein metal fibers of the web are joined by regions of glass to other metal fibers of the web. The nonwoven metal fibers can be the same or different lengths and do not need to be sintered.

In one embodiment of the material, a perforate matrix of glass at least partially envelops at least some metal fibers made of materials such as stainless steel, copper, or aluminum. The metal fibers are configured as a non-sintered, nonwoven sheet; and each of the metal fibers has a length in the range of 3 mm to 10 mm or more. The material has a weight in the range of 25 to 1,000 pounds per 3,000 square feet.

Spaces or voids between metal fibers allow embodiments of the material to be porous. However, the voids can be completely or partially filled to alter the porosity of the material.

An exemplary method of making a glass and metal fiber material in accordance with the invention includes the steps of juxtaposing metal fibers with glass fibers and heating at least the glass fibers to cause them to melt. The melting glass envelops part or all of the metal fibers. When the glass cools, at least some of the of metal fibers are bound to other metal fibers by the glass.

In one embodiment of the method, metal fibers and glass fibers are blended together to provide a mixture that is formed into a nonwoven web which is subsequently heated to cause at least some glass fibers to at least partially melt. Both the metal and glass fibers can be dispersed in a liquid prior to being mixed together; and a bonding aid can be added to the glass fibers and metal fibers prior to the heating step to temporarily provide stability to the web to permit processing.

In another embodiment of the method, a flexible, nonwoven, high-temperature material is fabricated by providing metal fibers having a length in the range of 3 mm to 10 mm and glass fibers having a diameter in the range of 0.4 to 4 microns. The glass fibers have a lower melting point than that of the metal fibers. The metal and glass fibers are mixed with a bonding aid such as an organic polymer that comprises no more than 5% of the volume of the mixture. The mixture is formed into a sheet-like configuration having a weight in the range of 25 to 1,000 pounds per 3,000 square feet and is heated to a temperature sufficient to remove the bonding aid from the mixture. Then, in a second heating stage, the mixture is heated to a temperature sufficient to cause at least some glass fibers to at least partially melt, thereby at least partially enveloping at least some of the metal fibers and fusing at least some of the metal fibers to each other.

BRIEF DESCRIPTION OF THE DRAWINGS

A more complete understanding of the present invention and the attendant advantages and features thereof will be more readily understood by reference to the following detailed description when it is considered in conjunction with the accompanying drawings wherein.

DETAILED DESCRIPTION OF THE INVENTION

Figure 1:
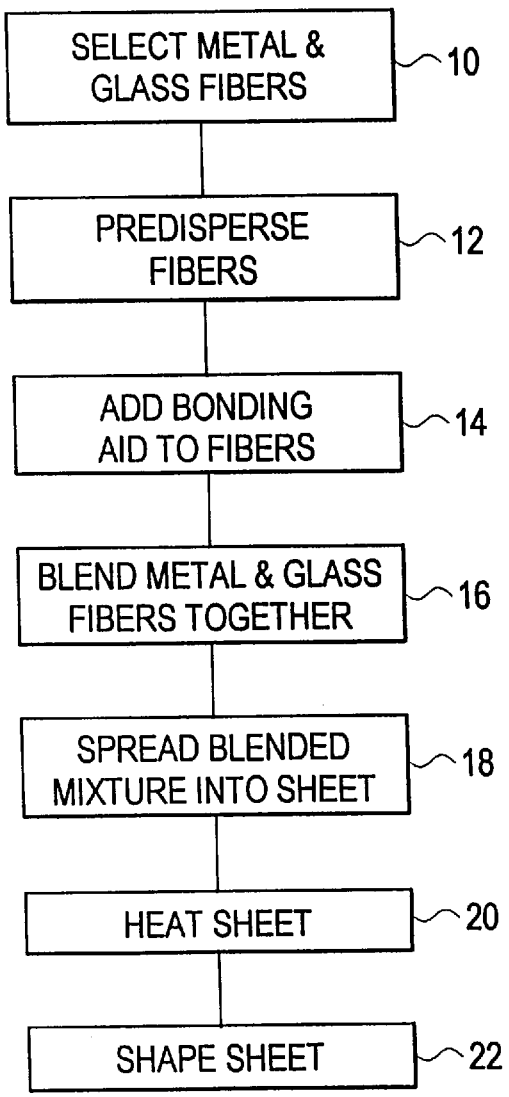
FIG. 1 is a flow chart of steps in a method of making a composite material in accordance with the present invention.

FIG. 1 is a flow chart of steps in a method of making a glass and metal fiber material in accordance with the present invention. A brief description of the process serves to introduce both the process and the inventive material; and each of the following steps is described in greater detail below. In a first step 10, metal and glass fibers are selected that provide desired thermal, electrical, chemical, and optical qualities. For a wet laid process, the metal and glass fibers can be predispersed in a liquid in a step 12. Prior to, during, or after the step of predispersion 12, a bonding aid can be added to the fibers in a step 14. Alternatively, the bonding aid can be added to the fibers during a step 16, wherein the glass and metal fibers are blended to form a mixture. The mixture is then used to form a sheet or web in a step 18. The web is heated in a step 20 to remove any remaining water and organic bonding aid. In a step 22 the web is configured for bulk shipment or cut and shaped as desired.

With respect to the first step 10, almost any metal or metal alloy capable of being formed or drawn into a filament or fiber is suitable for selection as a material for the metal fibers. Exemplary metals include stainless steel, copper, and aluminum. Although each of the selected metal fibers can be of the same metal or metal alloy, the metal fibers can include a selection of two or more different metals or metal alloys. The fibers can all be the same length; however, random or different length fibers ultimately produce a stronger composite. In exemplary embodiments, the metal fibers have lengths ranging from 3 mm to 10 mm. Although longer or shorter metal fibers may be selected, web formation is generally worse with metal fibers longer than 10 mm and strength is generally reduced with fibers shorter than 3 mm. Good material performance is obtained with metal fibers having diameters in the 2–4 micron range. However, the diameters can be larger or smaller if desired.

Similarly, almost any glass or glass composition capable of being formed or drawn into a filament or fiber is a suitable for selection as a material for the glass fibers. Exemplary embodiments include glass fibers typically used in glass fiber manufacture such as Schuller's URF-15 glass fibers. Boron free glass is particularly well suited for electrical applications. As with the metal fibers, each of the selected glass fibers can be of the same material. However, the glass fibers can include a selection of two or more different materials. The fibers can all be the same or different length. In exemplary embodiments, the glass fibers have a lengths ranging from 3 mm to 10 mm and diameters in the range of 0.4 to 4 microns. In other embodiments the glass fibers are 10 mm to 40 mm in length and from 4 to 20 microns in width. In each of the embodiments, the glass and metal fibers are selected so that the metal fibers have a higher melting point than the melting point for the glass fibers. Exemplary glass fibers are completely melted, but not vaporized, at 1350° F. to 1500° F.

As recited above, the method can further include a step 12 of predispersing the metal and glass fibers in a liquid when the web or sheet is to be formed by a wet laid process. Exemplary liquids suitable for predispersing metal fibers include carboxy methyl cellulose, hydroxy ethyl cellulose and ethyl hydroxy ethyl cellulose. Similarly, the glass fibers can be predispersed in an alkaline solution or an acidic solution such as sulfuric acid.

As noted, the process can include the optional step 14 of adding a bonding aid to enhance the handling properties of the web during processing. Exemplary bonding aids include organic and inorganic polymers. The organic bonding aids can be removed from the web by heat in a heating step 20. Typically, the bonding aid comprises 5% or less by volume of the mixture. However, more than 5% by volume of bonding aid can be included if desired.

The liquids including the respective glass and metal fibers are blended together to provide a mixture which is formed into a web or a sheet using wet laid techniques known to those skilled in the papermaking art, using papermaking machines. For a "light weight" material, the mixture is spread so that it has a weight in the range of 25 to 100 pounds per 3,000 square feet; whereas, a "heavy weight" material weighs over 100 pounds per 3,000 square feet. A very "heavy weight" material can be also be formed having a weight that is approximately 1,000 pounds per 3,000 square feet. The glass fibers act both as a dispersion and a suspension aid for the metal fibers to define a nonwoven metal and glass web. The glass fibers also contribute to handling properties similar to glass webs produced with papermaking machines.

Although the discussion of the present process is directed to a wet laid technique, with suitable modification the process and the resulting product can be made by the dry laid technique as well. For example, in a dry laid technique, the metal and glass fibers are combined in the desired ratio using techniques known to those skilled in the art and the resulting web is heated as described below. No other binders or dispersants are used.

In an exemplary embodiment, the mixture formulation that will yield the material after heating is 30 grams of 8 micron stainless steel fiber; 20 grams of 3.5 micron URF-15 glass fiber; 2 grams of 105-2 (4 mm) polyvinyl alcohol fiber as a bonding aid; and Bermocoll E411FQ as a dispersant for the stainless steel fiber. When tested for Frazier CFM permeability, a 50 pound, 3,000 square foot ream of material yields 666.6 CFM; and a 100 pound, 3,000 square foot ream of material yields 341 CFM.

Figure 2:
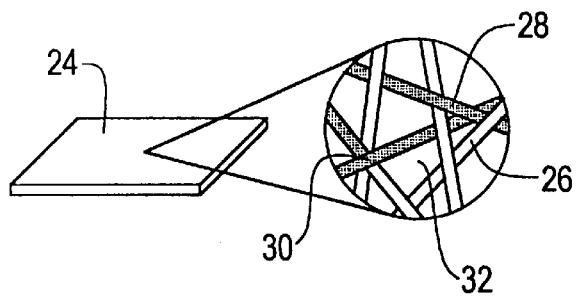
FIG. 2 is a perspective view, with a detailed representation, of a portion of a web of metal and glass fibers prior to being heated.

FIG. 2 illustrates a section of web material 24 following sheet formation in step 18 and prior to the heating step 20.

A magnified view of the web material 24 reveals that glass fibers 26 and metal fibers 28 have retained their elongated configurations; but they overlap, twist, and bend in a variety of orientations. However, it should also be noted that portions of many or most of the metal fibers 28 cross, intersect, touch or lie near portions of one or more other metal fibers. The point of nearness or touching of the metal fibers 28 will be referred to as intersection points 30. The non-intersecting portions of the metal fibers 28 define spaces or voids 32 in the material.

Figure 3:
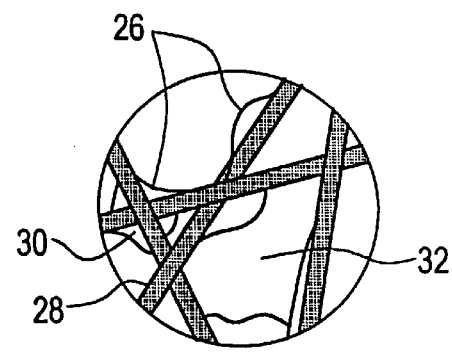
FIG. 3 is a magnified view of a portion of the web of FIG. 2 shown during a heating step.

FIG. 3 illustrates the magnified web material 24 of FIG. 2 during a heating step 20, wherein the temperature is sufficient to cause at least some glass fibers 26 to at least partially melt. As the glass fibers 26 melt, the glass that constitutes the fibers flows onto and around at least a portion of at least some of the metal fibers 28. Some of the melting/melted glass collects at the intersection points 30. Interestingly, as the glass melts, the voids 32 between the metal fibers that are established in the spreading step 18 remain substantially consistent as the glass flows around the metal fibers and collects at the intersection points 30. It should be noted that no special atmosphere is required during the heating step 20.

Figure 4:
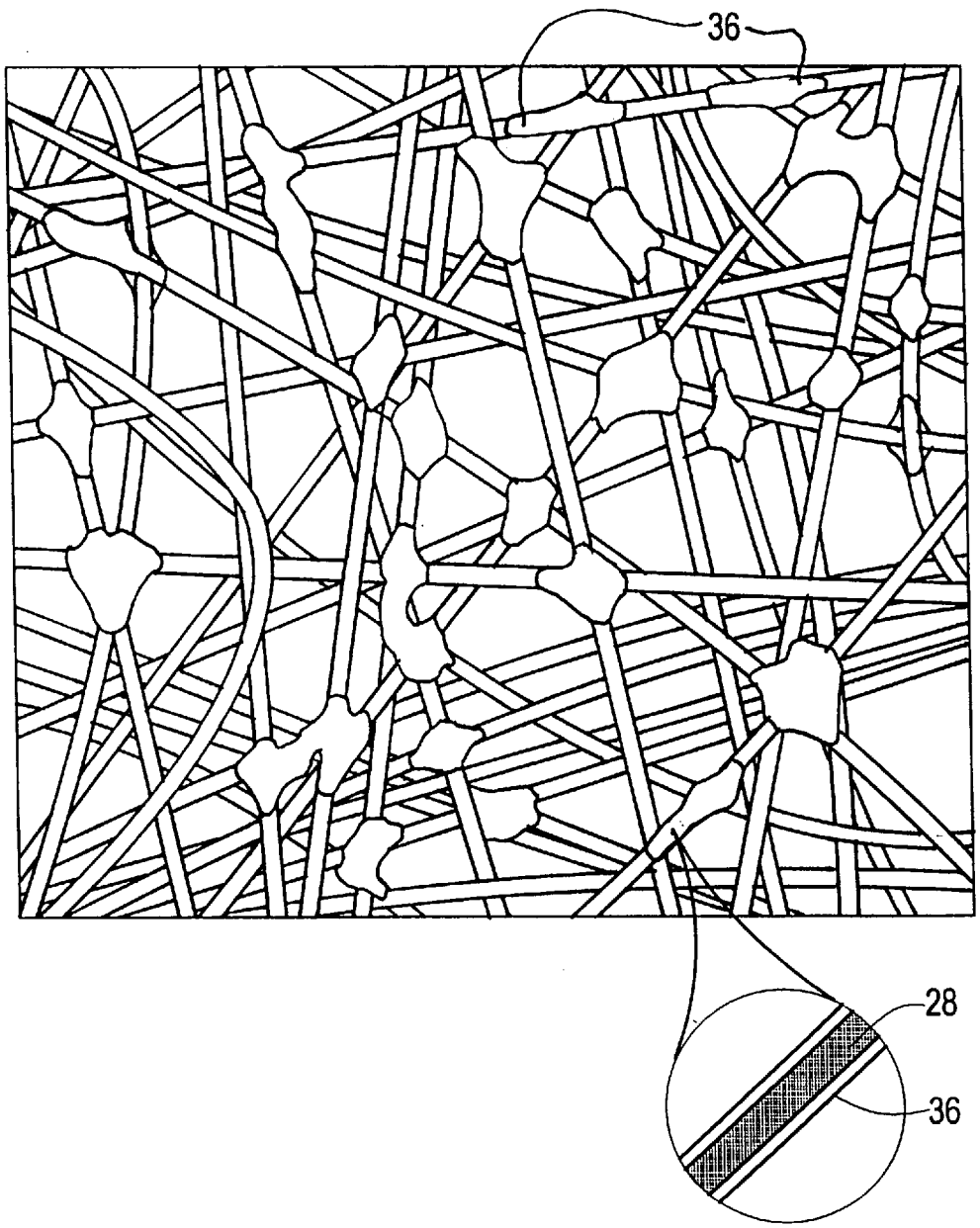
FIG. 4 is a magnified view of a portion of a fully bonded web.

FIG. 4 illustrates a magnified portion of a fully bonded web following the heating step 20. Little or no glass remains that is distinguishable as fibers, and glass bubbles 34 are extant at many intersection points 30. The glass bubbles bind the metal fibers together and provide coherency to the material. Bubble, as used herein, refers in a general manner to an agglomeration or collection of glass, or a thickened region, which may be round or irregular in shape and which may merge with or extend into a thin glass sheath 36 which coats many or most of the metal fibers 28, as shown in the magnified view of a single metal fiber. Further, although the bubbles 34 may include pockets of trapped gas, either intentionally or unintentionally, the bubbles can also be solid. Depending on the volume and dispersion of glass, the resulting material can be described as a perforate glass matrix having metal fibers dispersed throughout the matrix. Because the bonding points are dispersed and only comprise a small percentage of the total surface area of the material, the material is easily flexed. Breakage or failure of even a substantial number of glass bubbles 34, such as might occur during the step of shaping 22, does not cause the material to fall apart. Thus, without being sintered, the nonwoven metal fibers are bound together by glass alone without any other binder to provide a very uniform structure.

Figure 5:
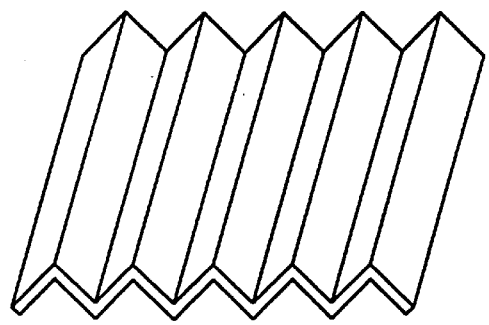
FIG. 5 illustrates the material in a folded configuration.

Because the bonded web is unexpectedly flexible, especially in lighter weights, it can be pleated, formed, shaped or folded onto itself without cracking or breaking. FIG. 5 illustrates a bonded web having multiple folds. Generally, a reduction in the glass fiber content results in a more flexible web that has a smoother edge when bent or folded as there is less or no sheathing glass at an intermediate point of the metal fibers that are bent. For very heavy weight material, the bonded web is preferably folded or formed prior to the heating step. After the heating step, the material retains the selected shape but is rather resilient or springy. Depending on the materials selected, the bonded web can have light transmission properties that range from opaque to translucent or substantially transparent. Furthermore, the material can be electrically conductive as described below.

Although the above material does not need any bonding aid other than the fused glass in its final form, it may be desirable to add a bonding aid to improve handling properties of the web prior to the heating step 20. For an embodiment of the process of making the material that includes the step of adding a bonding aid 14, the heating step can include a first heating stage, wherein a bonding aid, such as an organic polymer, is removed from the mixture at about 600° F., and a second heating stage, wherein the glass fibers are partially or completely melted at about 1,350° F. to 1,500° F. after the bonding aid is removed from the mixture. By removing the bonding aid prior to the second heating stage, the volatilization of any organic material during heating does not interfere with the metal fiber and glass bonding during the second heating stage.

The size and configuration of the perforations, pores, openings, holes, passages, spaces, or voids 32 through the material imparts a selected porosity to the material that is determined by the particular materials selected, the dimensions of the material, the configuration of the mixture, and the heating profile. The porosity of the material can also be modified by adding fillers.

Figure 6:
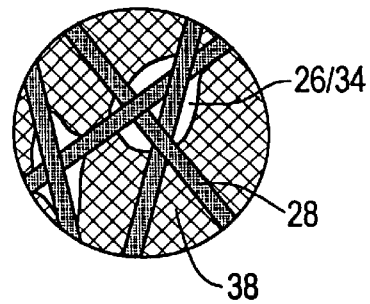
FIG. 6 is a magnified view of an embodiment of the web having a zero void volume.

For applications where a fluid or gas tight structure is desired, the material is rendered substantially or completely impermeable by saturating or filling the pores or voids 32 with a filler 38 to provide a sealing structure with a substantially zero void volume, as illustrated in FIG. 6. For applications subject to temperatures in the 500° F. to 1,000° F. range or higher, such as high temperature gaskets, the filler materials can include an inorganic material and a binder or latex. Exemplary inorganic materials include 10 micron or less mineral powders such as clay, mica, vermiculite, and colloidal silica, and 10 to 100 micron metal flakes of stainless steel, copper, or aluminum. Metal flakes, especially copper, increase the electrical conductivity of the material. Applications at 600° F. and below can benefit from organic fillers such as nitrile-butadiene, styrene-butadiene, acrylics, neoprene, and butyl rubber.

Figure 7:
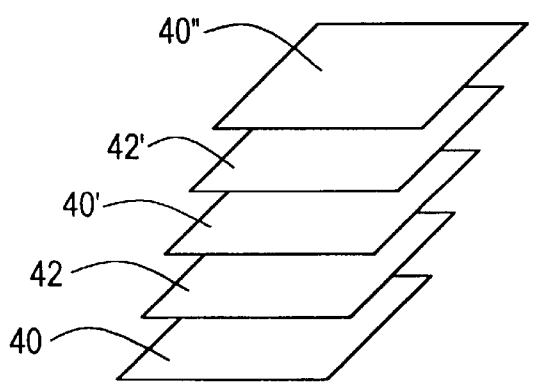
FIG. 7 is an exploded view of a layered composite material of the invention prior to heat bonding.

In another embodiment of the invention, the metal and glass fibers are formed separately as individual nonwoven glass and metal sheets that are juxtaposed and heated. FIG. 7, for example, is an exploded view of a five layer structure (before heating), including three metal fiber layers 40, 40', and 40" interleaved with two glass layers 42 and 42'. When the sandwiched structure is heated, the glass melts and bonds the fibers as described above. Additional layers of alternating glass and metal nonwoven sheets can be provided as desired.

Although the present invention specifically overcomes the disadvantages of sintering, a sintered metal fiber web can be sandwiched between two glass fiber sheets and heated to cause the glass to coat or sheath the sintered metal fibers or particles. Also, as described above, pores or voids in the sintered metal can be filled to provide a substantially zero void volume.

The glass configuration has been described as fiber-like (prior to being heated) in the preceding embodiments. However, other embodiments of the invention include mixing glass powders, with or without a binder, with the metal fibers in the blending step 16. Alternatively, a web of only metal fibers can be formed and sprinkled or covered with powdered glass which is heated and which collects at points of intersection to partially or completely sheath metal fibers. In yet another embodiment, a web of metal fibers is covered with a glassine film or a sheet of glass and then heated. In still another embodiment, a web of metal fibers is sprayed with molten glass and then heated, if required, to further melt and/or to disperse the molten glass droplets.

Variously configured, the material is well suited for applications such as airbag filters, extruder filter packs, EMI shielding, cathode ray tube masks, exhaust or process gas filters, gaskets and other high temperature applications. However, the use of the material is not limited to these applications.

Having described the structure and features of the material, the following tables present experimental data, some of which contain exemplary formulations of the material.

EXAMPLE I

|  | A | B | C | D |
|---|---|---|---|---|
| EHEC (metal fiber dispersant [ethylhydrox./ethyl cellulose]) | 4.0 gm | 4.5 gm | 4.5 gm | 4.5 gm |
| Water | 4000 ml | 4500 ml | 4500 ml | 4000 ml |
| S.S. (stainless steel) - $8\mu$ 3 mm Filter | 30.0 gm | 30.0 gm | 30.0 gm | 30.0 gm |
| S.S. - $8\mu$ 3 mm Filter | — | 5.0 gm | 5.0 gm | — |
| PVA (polyvinyl alcohol fiber) 105-2 (4 mm) | 2.0 gm | 2.0 gm | 2.0 gm | 2.0 gm |
| PBIV (fibrillated aramid fiber) (CSF 450–500) | — | — | 4.0 gm | — |
| U.S. Bronze Stainless Steel Powder | — | — | — | 20.0 gm |
| EHEC @ 0.1% | — | — | — | 300 ml |
| Sulfuric Acid - PH to 2.5 | — | — | — | — |
| Water | 3000 ml | 3000 ml | 3000 ml | 3000 ml |
| JM 106 Glass | 20.0 gm | 15.0 gm | 11.0 gm | 20.0 gm |

EXAMPLE II

| % solids 72396 | STD | A | B | C | C | C |
|---|---|---|---|---|---|---|
| EHEC | 4.0 gm | 4.0 gm | 4.0 gm | 4.0 gm | 4.0 gm | 4.0 gm |
| Water | 4000 ml | 4000 ml | 4000 ml | 4000 ml | 4000 ml | 4000 ml |
| S.S. - $8\mu$ | 30.0 gm | 30.0 gm | 30.0 gm | — | 30.0 gm | 30.0 gm |
| Ribtec S.S. - 316L | — | — | — | 30.0 gm | — | — |
| PVA 105-2 (4 mm) | 2.0 gm | 2.0 gm | 2.0 gm | 2.0 gm | — | — |
| BASF "PES" 20.0 gms | — | 212.8 gm | — | — | — | — |
| Polypropylene - Y600 20.0 gms | — | — | 50 gm | — | — | — |
| Mill Celco (CSF 90–100) 2.0 gms | — | — | — | 2 g dry | 2 gms dry | — |
| Mill Celco (CSF 90–100) 4.0 gms | — | — | — | — | — | 4 gms dry |
| Sulfuric Acid - PH to 2.5 | use | — | — | use | use | use |
| Water | 3000 ml | — | — | 3000 ml | 3000 ml | 3000 ml |
| JM 106 Glass | 20.0 gm | — | — | 20.0 gm | 20.0 gm | 20.0 gm |

EXAMPLE III

|  | D | D-1 | D-2 | D-3 | D-4 | D-5 | D-6 | D-7 |
|---|---|---|---|---|---|---|---|---|
| EHEC @ 0.1% | 4000 ml | 4000 ml | 4000 ml | 4000 ml | 4000 ml | 4000 ml | 4000 ml | 4000 ml |
| Stainless Steel @ 8 | 30.0 gm | 30.0 gm | 30.0 gm | 30.0 gm | 30.0 gm | 30.0 gm | 30.0 gm | 30.0 gm |
| PVA 105-2 (44 mm) | 2.0 gm | 2.0 gm | 2.0 gm | 2.0 gm | 2.0 gm | 2.0 gm | 2.0 gm | 2.0 gm |
| EHEC @ 0.1% | 300 ml | — | — | — | — | 300 ml | 300 ml | 300 ml |
| Straight water | — | 300 ml | 300 ml | 300 ml | 300 ml | — | — | — |
| US Bronze Stainless Steel Powder | 20.0 gm | — | — | — | — | — | — | — |
| Glomax LL (clay) | — | 15.0 gm | — | — | — | — | — | — |
| Vermiculite No. 7 | — | — | 15.0 gm | — | — | — | — | — |
| Calcine Mica | — | — | — | 15.0 gm | — | — | — | — |
| Emcore 66 (attapulgate) | — | — | — | — | 15.0 gm | — | — | — |
| Richgold 2000D (Bronze) | — | — | — | — | — | 15.0 gm | — | — |
| Copper 200 D | — | — | — | — | — | — | 15.0 gm | — |
| Aqua Past SN-C66-305 (aluminum) | — | — | — | — | — | — | — | 15.0 gm |
| Sulfuric Acid - PH to 2.5 | — | — | — | — | — | — | — | — |
| Water | 3000 ml | 3000 ml | 3000 ml | 3000 ml | 3000 ml | 3000 ml | 3000 ml | 3000 ml |
| "B-fine" Glass | 20.0 gm | 20.0 gm | 20.0 gm | 20.0 gm | 20.0 gm | 20.0 gm | 20.0 gm | 20.0 gm |

Although the invention has been shown and described with respect to exemplary embodiments thereof, various other changes, omissions and additions in form and detail thereof may be made without departing from the spirit and scope of the invention.

What is claimed is:

1. A material comprising a flexible, planar web of non-woven metal fibers and glass bubbles, wherein a plurality of metal fibers of the web are joined primarily at intersecting portions of the metal fibers by the bubbles of glass.

2. The material of claim 1, wherein the glass comprises a perforate matrix and the plurality of metal fibers are dispersed throughout the matrix.

3. The material of claim 1, wherein the web of nonwoven metal fibers is not sintered.

4. The material of claim 1, wherein the metal fibers have lengths in the range of 3 mm to 10 mm.

5. The material of claim 4, wherein each of the metal fibers are of substantially the same length.

6. The material of claim 2, wherein the material has a porosity in the range of 341 to 666.6 CFM for material having a ream weight in the range of 50 to 100 pounds per ream.

7. The material of claim 1, wherein the web of nonwoven metal fibers and glass is electrically conductive.

8. The material of claim 1, wherein the material has a weight in the range of 25 to 100 pounds per 3,000 square feet.

9. The material of claim 1, wherein the material has a weight of over 100 pounds per 3,000 square feet.

10. The material of claim 1, wherein the material has a weight of approximately 1,000 pounds per 3,000 square feet.

11. The material of claim 1, wherein the glass does not include boron.

12. The material of claim 1, wherein the metal fibers are selected from the group consisting of stainless steel, copper, and aluminum.

13. The material of claim 1, wherein the metal fibers and the bubbles of glass define voids, and wherein the voids are filled with an organic material.

14. The material of claim 13, wherein the organic material is selected from the group consisting of nitrile-butadiene, styrenebutadiene, acrylics, neoprene, and butyl rubber.

15. The material of claim 1, wherein the metal fibers and the bubbles of glass define voids, and wherein the voids are filled with an inorganic material.

16. The material of claim 15, wherein the inorganic material is selected from the group consisting of clay, mica, vermiculite, and metal flakes.

17. The material of claim 2, wherein the material further comprises a filler, and has a porosity of substantially zero.

18. A flexible material comprising a perforate matrix of glass at least partially enveloping at least some of a plurality of metal fibers selected from the group consisting of stainless steel, copper, and aluminum that are configured as a non-sintered, nonwoven sheet, each of the metal fibers having a length in the range of 3 mm to 10 mm, wherein the material has a weight in the range of 25 to 100 pounds per 3,000 square feet, and wherein the flexible material is capable of being pleated, formed, shaped and folded without breaking.

* * * * *

UNITED STATES PATENT AND TRADEMARK OFFICE
CERTIFICATE OF CORRECTION

PATENT NO. : 5,851,647
DATED : December 22, 1998
INVENTOR(S) : Foster

It is certified that error appears in the above-identified patent and that said Letters Patent is hereby corrected as shown below:

| Column | Line(s) | Reads | Should read |
|---|---|---|---|
| 7 | Example I, Column D | 4.5 gm | 4.0 gm |
| *3 | 67 | is a suitable for selection | is suitable for selection |
| *4 | 9 | fibers have a lengths | fibers have lengths |

Signed and Sealed this

Third Day of August, 1999

Attest:

Q. TODD DICKINSON

*Attesting Officer*  *Acting Commissioner of Patents and Trademarks*